United States Patent
Narayanan et al.

(10) Patent No.: US 12,222,975 B2
(45) Date of Patent: Feb. 11, 2025

(54) TRIGGERING EXECUTION OF MACHINE LEARNING BASED PREDICTION OF DOCUMENT METADATA

(71) Applicant: DocuSign, Inc., San Francisco, CA (US)

(72) Inventors: Kaushik Narayanan, Bellevue, WA (US); David Matthew Wong, Cupertino, CA (US); David Lange, Gothenburg (SE); Vinay Jethava, Bjarred (SE); Qing Zheng, Gothenburg (SE); Mohammad Mehdi Ghanimifard, Gothenburg (SE); Pontus Lindstrom, Olofstorp (SE); Gowtham Rangarajan Raman, Fremont, CA (US); David DeBarr, Lynnwood, WA (US); Yan He, Bellevue, WA (US)

(73) Assignee: Docusign, Inc., San Francisco, CA (US)

( * ) Notice: Subject to any disclaimer, the term of this patent is extended or adjusted under 35 U.S.C. 154(b) by 71 days.

(21) Appl. No.: 18/096,994

(22) Filed: Jan. 13, 2023

(65) Prior Publication Data
US 2024/0241901 A1    Jul. 18, 2024

(51) Int. Cl.
*G06F 16/38* (2019.01)
*G06F 16/34* (2019.01)
*G06F 16/383* (2019.01)

(52) U.S. Cl.
CPC .......... *G06F 16/383* (2019.01); *G06F 16/34* (2019.01)

(58) Field of Classification Search
CPC .............................. G06F 16/383; G06F 16/34
USPC ........................................................ 707/736
See application file for complete search history.

(56) References Cited

U.S. PATENT DOCUMENTS

| | | | |
|---|---|---|---|
| 11,314,935 B2 * | 4/2022 | Roberts | G06F 9/547 |
| 11,425,252 B1 * | 8/2022 | Martin | H04M 3/5141 |
| 11,556,524 B2 * | 1/2023 | Franz | G06F 16/258 |
| 11,836,817 B2 * | 12/2023 | Hunn | H04L 63/12 |
| 11,847,252 B2 * | 12/2023 | Ashlock | G06Q 20/4014 |
| 11,900,222 B1 * | 2/2024 | Alakuijala | G06N 3/04 |
| 2009/0006948 A1 * | 1/2009 | Parker | H04L 65/403 715/255 |
| 2014/0222928 A1 * | 8/2014 | Scholtes | H04L 51/046 709/206 |
| 2018/0181964 A1 * | 6/2018 | Zagarese | G06Q 20/40145 |
| 2020/0322346 A1 * | 10/2020 | Van Rensburg | H04L 63/105 |

(Continued)

*Primary Examiner* — Hicham Skhoun
(74) *Attorney, Agent, or Firm* — KDW Firm PLLC

(57) ABSTRACT

A system predicts metadata attributes associated with documents using machine learning models. The document may represent an interaction between entities. The system trains machine learning models to predict scores indicating whether a token or a sequence of token of a document represents a metadata attribute. The metadata prediction is used to annotate the document and display to users. The system receives user feedback via the user interface and uses the user feedback to evaluate or retrain the model. The system generates training data by receiving a set of annotated documents and comparing the annotated documents against other documents to identify matching documents. The system determines when to execute the machine learning based metadata prediction based on steps of document workflow executed by the system.

20 Claims, 12 Drawing Sheets

(56) References Cited

U.S. PATENT DOCUMENTS

| | | | | |
|---|---|---|---|---|
| 2020/0356922 | A1* | 11/2020 | Engineer | G06N 20/00 |
| 2020/0371647 | A1* | 11/2020 | Gerges | G06F 40/151 |
| 2021/0049239 | A1* | 2/2021 | Li | G06F 40/30 |
| 2021/0064866 | A1* | 3/2021 | Rezvani | G06N 20/00 |
| 2021/0149899 | A1* | 5/2021 | Gutiérrez | G06F 16/252 |
| 2021/0200742 | A1* | 7/2021 | Labutov | G06F 40/197 |
| 2021/0243193 | A1* | 8/2021 | Padmanabhan | G06F 16/252 |
| 2021/0256156 | A1* | 8/2021 | Enuka | G06F 21/6245 |
| 2021/0406716 | A1* | 12/2021 | Broyles | G06F 40/174 |
| 2022/0076007 | A1* | 3/2022 | Rout | G06F 40/30 |
| 2022/0100772 | A1* | 3/2022 | Kadarundalagi Raghura | G06F 21/6218 |
| 2022/0206762 | A1* | 6/2022 | Makhija | G06F 9/547 |
| 2022/0309387 | A1* | 9/2022 | Rodriguez | H04L 9/3213 |
| 2023/0037077 | A1* | 2/2023 | Gutta | G06F 16/3344 |
| 2023/0177015 | A1* | 6/2023 | Madisetti | G06F 40/289 707/608 |
| 2023/0379180 | A1* | 11/2023 | Khaykovich | H04L 9/50 |
| 2024/0028301 | A1* | 1/2024 | David | G06F 40/216 |

* cited by examiner

TRIGGERING EXECUTION OF MACHINE LEARNING BASED PREDICTION OF DOCUMENT METADATA

TECHNICAL FIELD

This disclosure generally relates to the field of document management, and specifically to using machine learning models to predict metadata describing documents.

BACKGROUND

Online document management systems are used to create and review documents and provide users with tools to edit, view, and execute the documents. Since documents are typically drafted and edited manually, there are significant chances of errors occurring in the document. As a result of such errors, the document management system may associate a document with incorrect metadata describing the document or portions of the document. A document management system may manage workflows associated with documents. Incorrect metadata describing the documents may cause the document management system to execute incorrect steps in a document workflow. For example, the document may be routed to an incorrect entity, or a workflow task may be scheduled incorrectly. Such document errors may result in delays in execution of a document workflow as well as errors that may be difficult to correct at a late stage in the document workflow.

SUMMARY

A system, for example, a document management system uses machine learning models to predict document metadata. A document may represent an interaction between entities. The metadata attributes describe the interaction between the entities. A metadata attribute may be associated with a token from the document or a sequence of tokens, for example, a sentence or a paragraph of the document. For example, a metadata attribute may represent a date associated with the interaction, a value associated with the interaction, a role of an entity in the interaction, a type of clause represented by a paragraph or a section of the document, and so on.

The system performs metadata prediction as follows. The system receives a document representing an interaction between multiple entities. The system extracts a set of tokens and/or sequences of tokens from the document. A sequence of tokens comprises tokens that occur adjacent to each other in the document, for example, a sentence or a paragraph from the document. The system provides the tokens or sequences of tokens as input to a machine learning model. The machine learning model is trained to predict scores indicating a likelihood that a token or a sequence of tokens of an input document represents a metadata attribute describing the interaction between the plurality of entities. The system executes the machine learning models to predict metadata attributes describing tokens or sequences of tokens of the document. The system annotates the document with the predicted metadata attributes. The annotated document may be sent for display to a user, for example, to receive user feedback regarding the accuracy of predictions of the machine learning models.

The system generates training data for training the machine learning models. According to an embodiment, the system initializes a training dataset using a set S1 of documents. The set S1 of documents may represent documents that have been annotated by users, for example, experts. Each document of the set S1 is associated with an interaction between entities. An annotated document from set S1 includes annotations or tags that map tokens or sequences of tokens of the document to metadata attributes describing the interaction. The system receives a set S2 of documents that is larger than the set S1 of documents. For example, set S2 may be a public archive of documents that may include documents of various types. The system generates feature vector representations of documents from the sets S1 and S2. The system compares documents from the set S1 with documents from the set S2 by comparing feature vectors representing the corresponding documents. The system identifies a subset of documents from the set S2 that match at least a document from the set S1. The system adds the subset of documents to the training dataset. The documents of the subset added to the training dataset may be labeled. The system trains a machine learning model using the training dataset.

According to an embodiment, the system matches two documents based on a subset of features of the feature vectors representing the documents. The subset of the features is determined as follows. The system selects a document from the set S1. The system identifies a portion of the document that is associated with a metadata attribute. The system modifies the identified portion of the document, for example, by replacing the portion of the document with dummy keywords or by removing the portion of the document. The system identifies features of the feature vector of the document for which the value changes by more than a threshold value as a result of modifying the identified portion of the document. The system includes these features in the subset of features used for comparing documents.

According to an embodiment, the system performs machine learning based predictions of metadata for documents based on specific trigger criteria that are evaluated during a document workflow. The system executes document workflows for one or more documents. Each document workflow comprises a plurality of steps. The system receives trigger criteria that specify when metadata prediction using machine learning models is performed. Each trigger criterion specifies conditions for triggering execution of machine learning based prediction of metadata attributes. The system repeatedly executes the following steps for each document. The system monitors execution of each document workflow. The system receives status of execution of a particular step of document workflow for the document. The system evaluates a trigger criterion associated with the document based on the received status of execution of the particular step. If the evaluation of the trigger criterion indicates that metadata prediction should be triggered, the system sends request for prediction of metadata attributes based on the document. The prediction of metadata attributes is performed by executing the machine learning models. The system annotates the document with metadata attributes predicted using the machine learning models. The system sends for display, the annotated document via a user interface.

According to an embodiment, the system receives user feedback via the user interface. The user feedback includes either (1) a correction of a predicted metadata attribute or (2) an approval of a predicted metadata attribute or (3) entry of a missing attribute. The system may use the user feedback for performing evaluation of the machine learning models. The system may generate training data based on the user feedback. This allows the system to incorporate user feedback received during production for evaluating and training of the machine learning models.

The processes disclosed herein may be executed using one or more computer processors. Instructions of the processes may be stored in non-transitory storage media. Computer systems may include computer processors and non-transitory storage media storing instructions of the processes.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 is a high-level block diagram of a system environment for a document management system, in accordance with an example embodiment.

Figure 1:
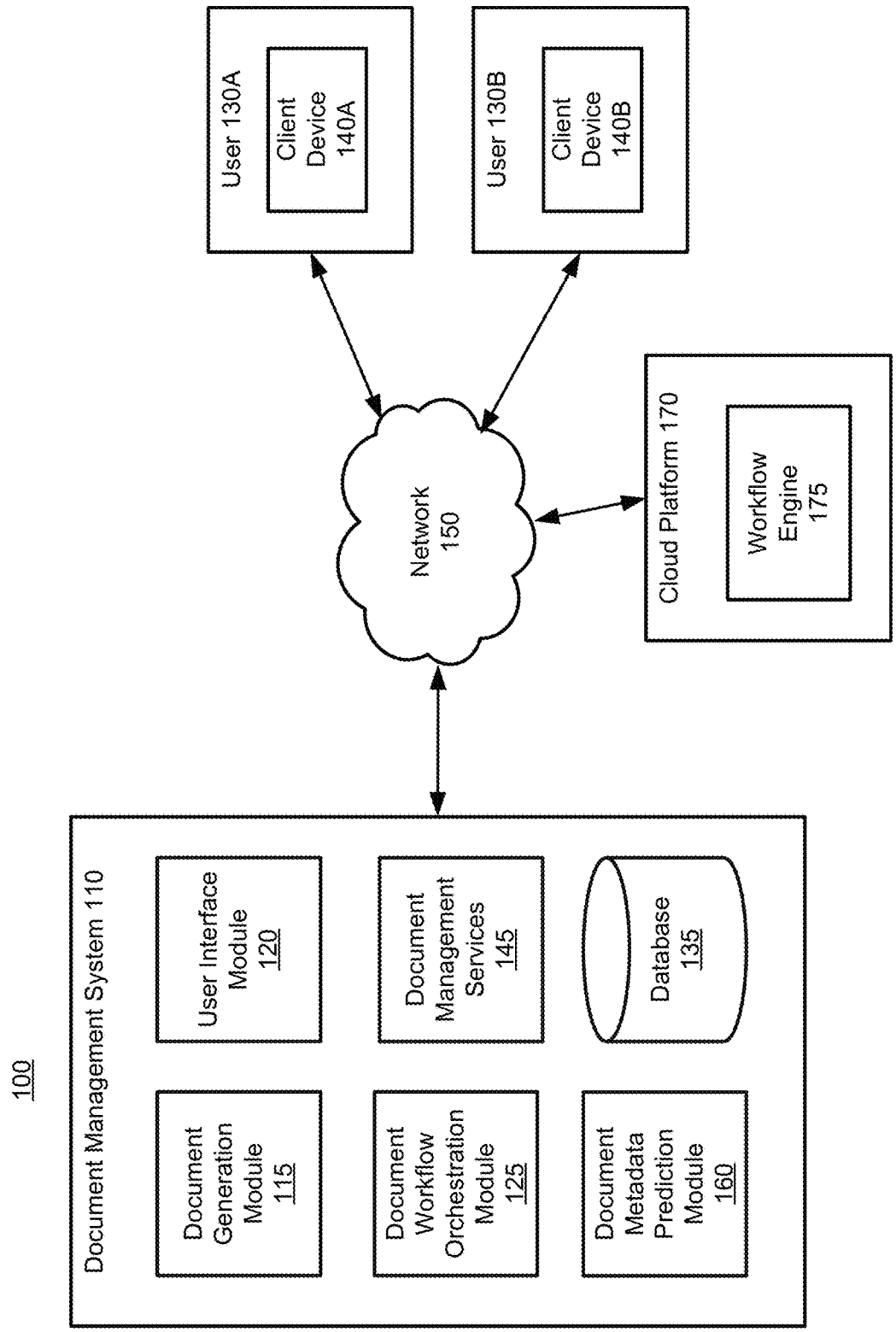

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. A letter after a reference numeral, such as "120A," indicates that the text refers specifically to the element having that particular reference numeral. A reference numeral in the text without a following letter, such as "120," refers to any or all of the elements in the figures bearing that reference numeral.

DETAILED DESCRIPTION

A system, for example, a document management system, uses artificial intelligence techniques such as machine learning to predict metadata attributes of documents. According to an embodiment, the document represents an interaction between two or more entities. The metadata attributes may describe the interaction between the entities. For example, the machine learning model may predict the type of interaction, the specific entities that are performing the interaction, the roles of the entities, and other attributes describing the interaction. For example, the document may be a contract or agreement between two entities. An entity may be a user, an organization, a business, and so on. Each entity may have one or more user accounts in the document management system. The user accounts may be used to interact with the document, for example, to execute document workflows associated with documents, to view the predictions of the machine learning models, and to provide feedback to the system regarding the accuracy of the predictions.

Document Management System Over View

A document management system enables an entity, also referred to herein as a party (e.g., individuals, organizations, etc.) to create and send documents to one or more receiving parties for negotiation, collaborative editing, electronic execution (e.g., via electronic signatures), contract fulfillment, archival, analysis, and more. For example, the document management system allows users of the entity to create, edit, review, and negotiate document content with other users and other entities using the document management system.

The system environment described herein can be implemented within the document management system, a document execution system, or any type of digital transaction management platform. It should be noted that although description may be limited in certain contexts to a particular environment, this is for the purposes of simplicity only, and in practice the principles described herein can apply more broadly to the context of any digital transaction management platform. Examples can include but are not limited to online signature systems, online document creation and management systems, collaborative document and workspace systems, online workflow management systems, multi-party communication and interaction platforms, social networking systems, marketplace and financial transaction management systems, or any suitable digital transaction management platform.

Users may choose to take a set of actions with respect to the generated document. Document actions may include, for example, sending the document to another user for approval, signing the document, initiating a negotiation of the terms of the document, and so on. The document management system allows users to customize a workflow for these document actions such that the document management system automatically performs actions upon request.

The techniques disclosed herein improve the document review process in a document management system. The system catches possible errors in the document and improves the accuracy of information associated with the document. For example, metadata describing the document may be used by a document management system to control document workflows. A document may be routed to different users or parties during the document workflow and request specific actions from users. For example, a document may represent a contract between a plurality of entities, such as service agreements, rental agreements, employment contracts, merger agreements between organizations, purchase agreements, mortgage documents, and the like. A document representing a contract may include various portions that have particular significance. A user typically manually reviews each individual document and flag various sections of the document. These techniques are inefficient, time intensive, and prone to human error, potentially exposing the user and entity to greater costs and legal liability. Errors in document metadata may cause the document workflow to route the document incorrectly, request information in incorrect order, or request incorrect actions from users. These errors cause waste of resources including computing and user resources.

The system as disclosed predicts metadata describing a document using artificial intelligence techniques such as machine learning models. Automated prediction improves the efficiency of the document workflows as well as improves the accuracy of information by reducing manual steps. The system presents predicted metadata attributes to users and allows users to manually verify the metadata attributes and override the predicted values as necessary. This achieves higher accuracy of determining document metadata compared to a system that relies on manual determination of document metadata. The system further automates the process of determining the stages in a document workflow when the metadata prediction is triggered. Metadata prediction may also be referred to as machine learning based metadata prediction herein. This allows the system to automatically trigger the metadata prediction process during various stages of a document workflow. Manual handling of the process of repeatedly determining document metadata during a document workflow is likely to significantly slow the document workflow. As a result, the system improves the efficiency of the document workflow due to high accuracy of the document metadata and automated determination of document metadata. The system also ensures higher accuracy of steps of document workflow through the system as a result of high accuracy of document metadata. The ability to tag the documents with metadata information further allows the documents to be classified better. The document tags also allow the documents to be discovered faster and more efficiently since the system is able to index the document based on metadata attributes and searches for the document can utilize the indexes to improve efficiency. The system may also use the metadata attributes to determine how to store the document, for example, in a folder or directory structure that is intended for documents of a particular type. Given examples of documents and manually extracted metadata, this system learns to predict metadata; i.e. given a new document, the system automatically extracts the metadata. This reduces the time and effort to ingest documents, enabling reporting functions such as notifications for upcoming agreement termination, renewal, and obligation dates. Having enhanced (extended) metadata extracted also makes it easier to search and report on various features, such as contract values and the presence of contractual clauses, which can help assess risk. Furthermore, the system identifies the location(s) in the document where the metadata can be found, assisting in the review process when initially adapting the system for a new customer. The system also identifies changes to documents during any workflow such as negotiation. The changes are highlighted to the user, thereby improving the user experience and making the workflow efficient.

FIG. 1 is a high-level block diagram of a system environment 100 for a document management system 110, in accordance with an example embodiment. The system environment 100 enables users 130A-B to more efficiently generate documents with the document management system 110. As illustrated in FIG. 1, the system environment 100 includes a document management system 110, users 130A, 130B, and corresponding client devices 140A, 140B, each communicatively interconnected via a network 150. In some embodiments, the system environment 100 includes components other than those described herein. For clarity, although FIG. 1 only shows two users 130A, 130B and two client devices 140A, 140B, alternate embodiments of the system environment 100 can have any number of users 130A, 130B and client devices 140A, 140B. For the purposes of concision, the web servers, data centers, and other components associated with an online system environment are not shown in FIG. 1.

The document management system 110 is a computer system (or group of computer systems) for storing and managing documents for the users 130A-B. Using the document management system 110, users 130A-B can collaborate to create, edit, review, and negotiate documents. Examples of documents that may be stored, analyzed, and/or managed by the document management system 110 include contracts, press releases, technical specifications, employment agreements, purchase agreements, services agreements, financial agreements, and so on. The document management system 110 can be a server, server group or cluster (including remote servers), or another suitable computing device or system of devices. In some implementations, the document management system 110 can communicate with client devices 140A-B over the network 150 to receive instructions and send documents (or other information) for viewing on client devices 140A-B. The document management system 110 can assign varying permissions to individual users 130A-B or groups of users controlling which documents each user can interact with and what level of control the user has over the documents they have access to.

The document management system 110 includes a document generation module 115, a user interface module 120, a document workflow orchestration module 125, document management services 145, a document metadata prediction module 160, and a database 135. Computer components such as web servers, network interfaces, security functions, load balancers, failover servers, management and network operations consoles, and the like may not be shown so as to not obscure the details of the system architecture. The document management system 110 may contain more, fewer, or different components than those shown in FIG. 1 and the functionality of the components as described herein may be distributed differently from the description herein.

The database 135 stores information relevant to the document management system 110. The database 135 can be implemented on a computing system local to the document management system 110, remote or cloud-based, or using any other suitable hardware or software implementation. The data stored by the database 135 may include, but is not limited to, documents for analysis and/or execution, client device identifiers (e.g., of the client devices 140A-B), document clauses, version histories, document templates, and other information about document stored by the document management system 110. In some embodiments, the database 135 stores metadata information associated with documents or clauses, such as documents annotated (i.e., tagged) with metadata that may be used for training machine learning models. The document management system 110 can update information stored in database 135 as new information is received, such as new documents and feedback from users. The document management system 110 can update information stored in the database 135 based on user input received from a user interface, via the user interface module 120. Updates to machine learned models are also stored in the database 135.

Figure 2:
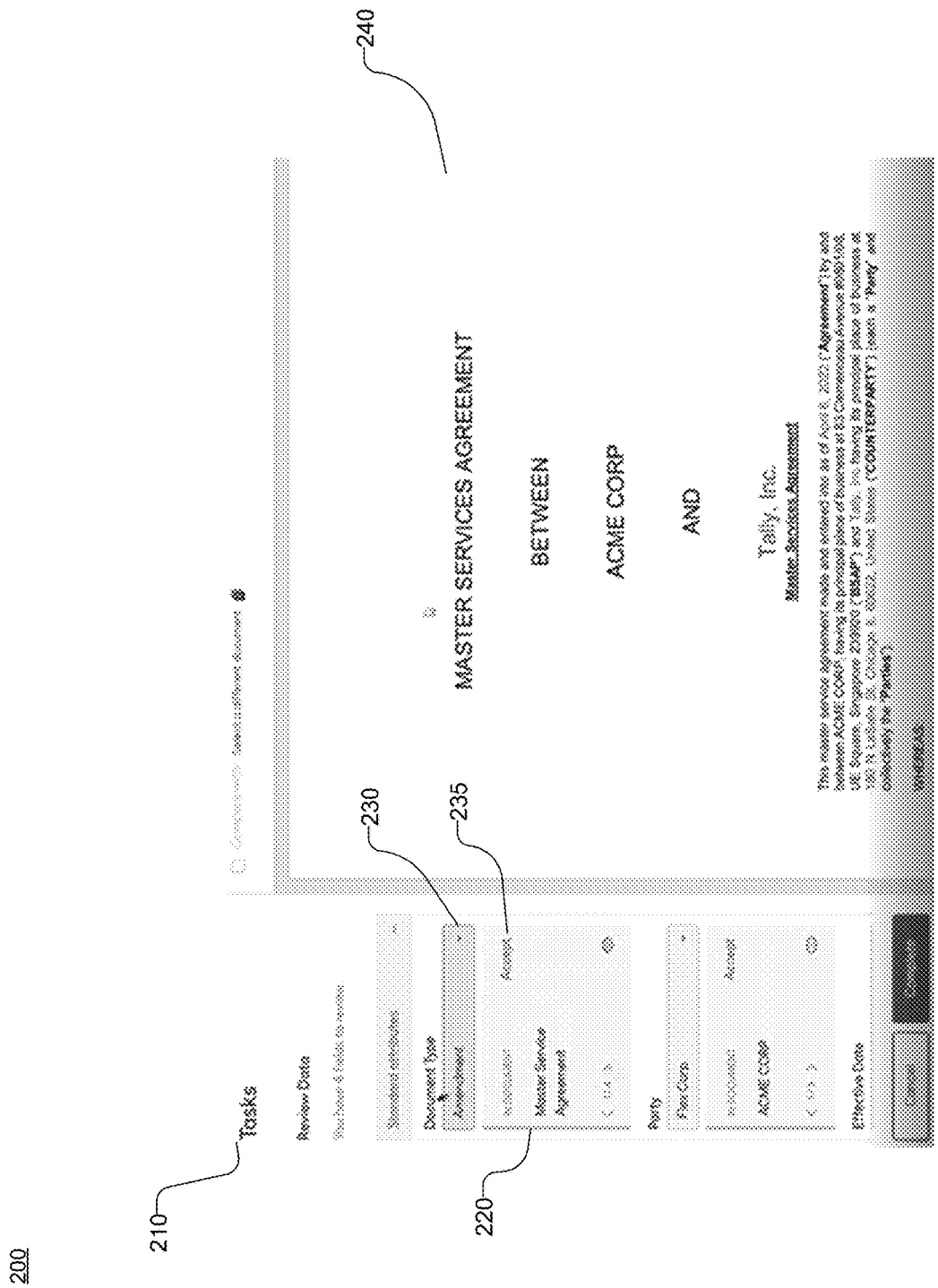
FIG. 2 is an example screenshot of a user interface for presenting metadata predicted using machine learning models, according to an embodiment.

The document metadata prediction module 160 uses artificial intelligence techniques such as machine learning to predict metadata describing a document. For example, the document metadata prediction module 160 trains and executes machine learning modules to predict metadata attributes describing tokens or sequences of tokens such as sentences of a document. Details of the document metadata prediction module 160 are further shown herein, for example, as illustrated in FIG. 2 and described in connection with FIG. 2.

The document management services 145 may perform predefined operations invoked by a document workflow. These include a signing service, an identity verification service, a form generation service, and so on. According to an embodiment, the document workflow orchestration module 125 invokes APIs (application programming interfaces) for executing any of the document management services 145. The document workflow orchestration module 125 may invoke an API remotely for executing a document management service 145 in a workflow engine 175 executing in a cloud platform 170 distinct from the system executing the document management services 145. A workflow engine 175 may include one or more modules of a document management system 110 that execute steps of a document workflow. For example, the workflow engine 175 may include one or more document management services 145 that performs actions performed during document workflows such as signing of documents, identity verification, form generation, document generation from metadata, receiving data from a data source, sending a message to a user, or storing a record in a database (e.g., database 135), and so on. The functions of a workflow engine 175 may be executed by invoking application programming interfaces (APIs) of the workflow engine 175. For example, a document workflow orchestration module 125 may remotely execute operations supported by one or more workflow engines 175 to complete execution of a document workflow across multiple workflow engines, each executing on a distinct cloud platform. The document workflow may include actions associated with a document including, but not limited to, approving the document, finalizing the document, signing the document, providing the document to another user, revising the document, and so on.

The document workflow orchestration module 125 allows users to design a document workflow, deploy the workflow, and execute the workflow. The document workflow specification as specified by a user is independent of the platform on which it can be executed. For example, the document workflow specification can be executed on a workflow engine executing on any of a plurality of cloud platforms such as AWS (Amazon Web Services), GCP (Google Cloud Platform), AZURE, and so on. In an example document workflow, the document generation module 115 presents the generated document preview, allowing the user to take a set of document actions. Example document actions include, but are not limited to, approving the document, finalizing the document, signing the document, providing the document to another user, and revising the document. The user may manually carry out the document actions. The document workflow orchestration module 125 allows a user (e.g., a workflow designer) to define workflows (e.g., a sequence of document actions) that the document management system 110 performs automatically.

According to an embodiment, the document workflow orchestration module 125 processes a platform independent workflow specification of a workflow. The platform independent workflow specification may be represented using nested objects such that each nested object represents a step of the workflow. According to an embodiment, the platform independent workflow specification as well as the platform specific workflow specification are specified using JSON (JavaScript Object Notation) format. A document workflow orchestration module 125 receives information identifying a particular platform, for example, a workflow engine executing on a target cloud platform and compiles the platform independent document workflow specification to generate a platform specific document workflow specification. For example, the target cloud platform may be AWS, GCP, or AZURE. A document workflow orchestration runtime executes the generated platform specific document workflow specification by invoking the appropriate APIs of the workflow engines executing on the target cloud platform.

The document generation module 115 facilitates the creation of documents. According to an embodiment, a user uploads a training document and the document generation module 115 generates a document template based on a type of the training document by providing instance-specific details, such as party names, dates, values, and locations. In some embodiments, the document generation module 115 generates the document template in response to a user request. The document generation module 115 may produce templates for employment agreements, distribution agreements, sales agreements, non-disclosure agreements, leases, promissory notes, and so on.

The user interface (UI) module 120 generates user interfaces allowing users (e.g., the users 130A-B) to interact with the document management system 110. The UI module 120 displays and receives user input for the embedded tagging interface, the form interface, and the workflow interface in the document management system 110. The UI module 120 also provides a user interface for users to add, delete, or modify the contents of a document template, document preview, or finalized document based on permission definitions. Additionally, in some embodiments, the UI module 120 may provide a user interface that allows users to modify content such as text, images, links to outside sources of information such as databases, and the like. According to an embodiment, the UI module 120 configures a user interface that presents a document annotated with metadata attributes predicted by machine learning models.

FIG. 2 is an example screenshot of a user interface for presenting metadata predicted using machine learning models, according to an embodiment. The user interface 200 allows users to either accept the prediction of the machine learning model or reject the prediction and specify a new value, i.e., modify the metadata attribute that was predicted by the machine learning model. According to an embodiment, the system also displays portions of the document that were used to make a metadata prediction. For example, if multiple portions of the document predicted the metadata attribute, the system may highlight all these portions or allow user to review all these portions. The portion of the document that is used to make a metadata prediction may not match the metadata prediction textually. For example, the system may predict a date value associated with an interaction associated with the document, for example, a deadline associated with the interaction. However, the date value as predicted may not occur in the text of the document, for example, due to differences in format between the metadata attribute and the representation of the date in the document (MM/DD/YYYY vs Month Day, Year). Similarly, the machine learning model may predict a role of an entity in the interaction based on the document. However, the document may not use the same language for specifying the role that was predicted by the metadata. However, the system highlights the portions of the document used to make the prediction, even if there is no textual match between the text of the predicted metadata attribute and the highlighted portion of the document (Incorporated vs Corp).

For example, the document metadata prediction module 160 analyses the document shown in panel 240 of the user interface and presents the user with a set of tasks shown in panel 210 of the user interface. The tasks show specific predictions to the user and allow the user to accept a prediction using a widget 235, for example, a button or a URL (uniform resource locator). The user interface also provides the user with widgets 230 that allow the user to modify the metadata attribute value as predicted by the machine learning model if the user does not accept the prediction.

Users 130A-B of the client devices 140A-B can perform actions relating to documents stored within the document management system 110, for example, actions associated with the user interface 200. Each client device 140A-B is a computing device capable of transmitting and/or receiving data over the network 150. Each client device 140A-B may be, for example, a smartphone with an operating system such as ANDROID® or APPLE® IOS®, a tablet computer, laptop computer, desktop computer, or any other type of network-enabled device from which secure documents may be accessed or otherwise interacted with. In some embodiments, the client devices 140A-B include an application through which the users 130A-B access the document management system 110. The application may be a stand-alone application downloaded by the client devices 140A-B from the document management system 110. Alternatively, the application may be accessed by way of a browser installed on the client devices 140A-B and instantiated from the document management system 110. The client devices 140A-B enables the users 130A-B to communicate with the document management system 110. For example, the client devices 140A-B enables the users 130A-B to access, review, execute, and/or analyze documents within the document management system 110 via a user interface. In some implementations, the users 130A-B can also include AIs, bots, scripts, or other automated processes set up to interact with the document management system 110 in some way. According to some embodiments, the users 130A-B are associated with permissions definitions defining actions users 130A-B can take within the document management system 110, or on documents, templates, permissions associated with other users and/or workflows.

The network 150 transmits data within the system environment 100. The network 150 may be a local area or wide area network using wireless or wired communication systems, such as the Internet. In some embodiments, the network 150 transmits data over a single connection (e.g., a data component of a cellular signal, or Wi-Fi, among others), or over multiple connections. The network 150 may include encryption capabilities to ensure the security of customer data. For example, encryption technologies may include secure sockets layers (SSL), transport layer security (TLS), virtual private networks (VPNs), and Internet Protocol security (IPsec), among others.

System Architecture of Document Metadata Prediction Module

Figure 3:
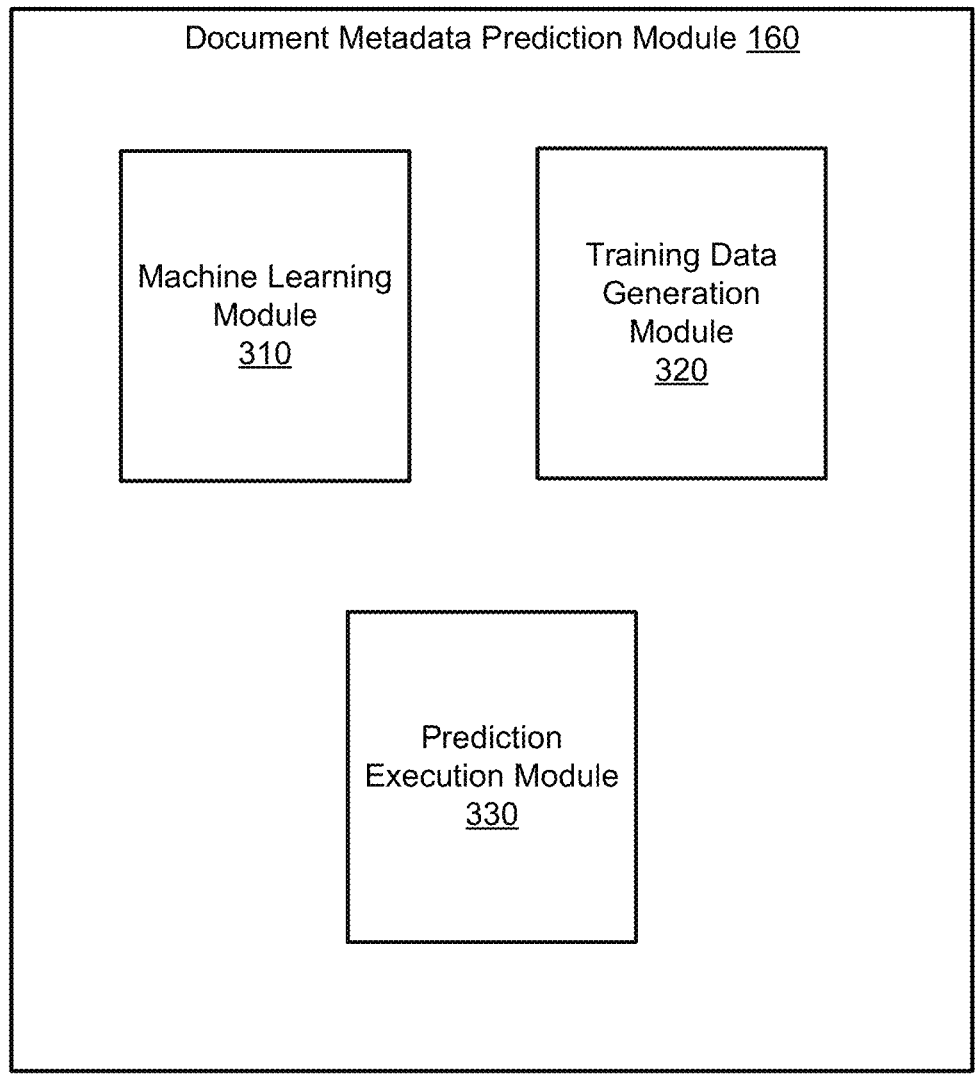
FIG. 3 is a high-level block diagram of a system architecture of a document metadata prediction module, in accordance with an example embodiment.

FIG. 3 is a high-level block diagram of a system architecture of a document metadata prediction module, in accordance with an example embodiment. The document metadata prediction module 160 includes a machine learning module 310, a training data generation module 320, and a model execution module 330. Other embodiments may include more, fewer, or other modules than those indicated in FIG. 3 and not all modules of the document metadata prediction module 160 are shown in FIG. 3.

Figure 4:
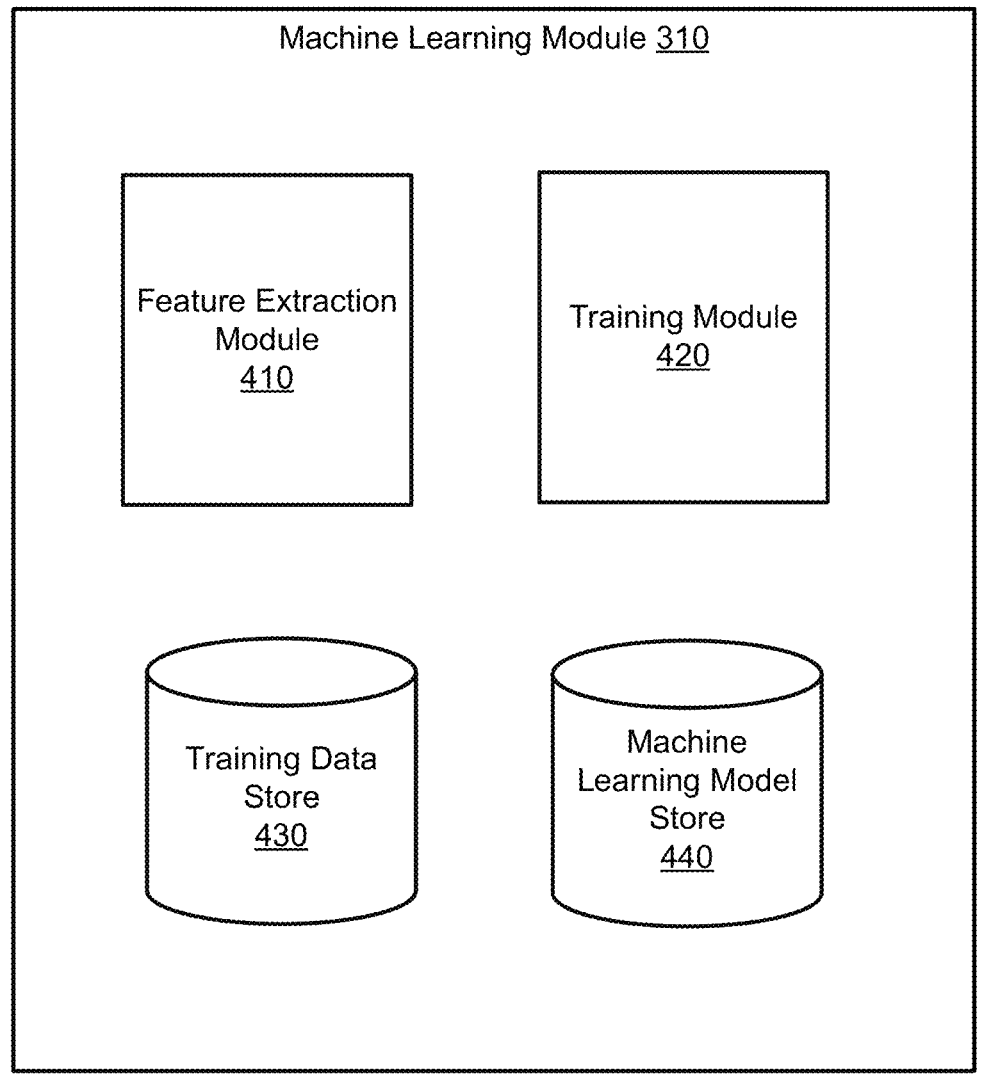
FIG. 4 is a high-level block diagram of a system architecture of the machine learning module invoked by the document metadata prediction module, in accordance with an example embodiment.
Figure 5:
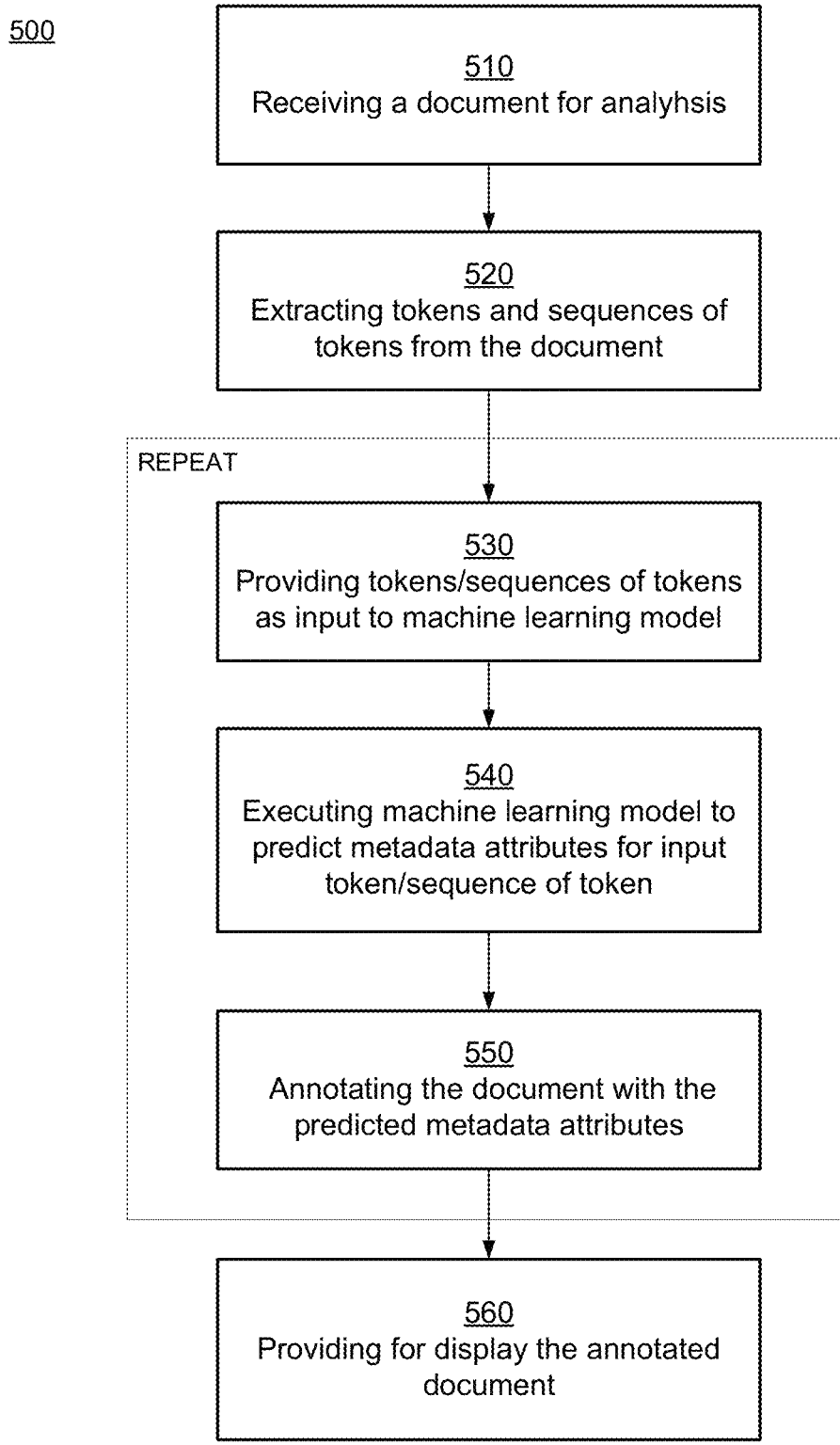
FIG. 5 is a flowchart illustrating a process for predicting metadata attributes for a document using machine learning models, in accordance with an example embodiment.

The machine learning module 310 trains a machine learning model to predict metadata associated with documents. Details of the architecture of the machine learning module 310 are shown in FIG. 4 and a process associated with the machine learning module 310 is shown in FIG. 5.

Figure 6:
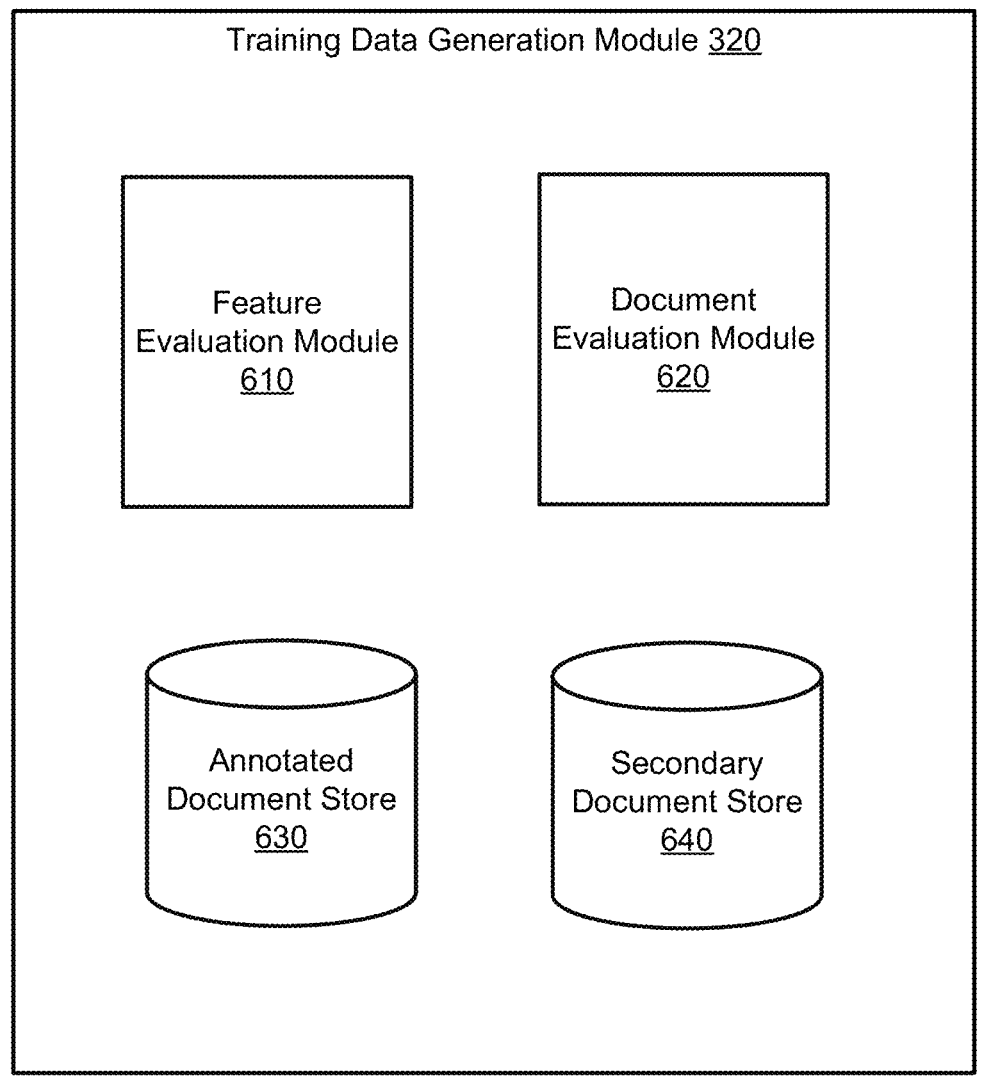
FIG. 6 is a high-level block diagram of a system architecture of a training data generation module, in accordance with an example embodiment.
Figure 7:
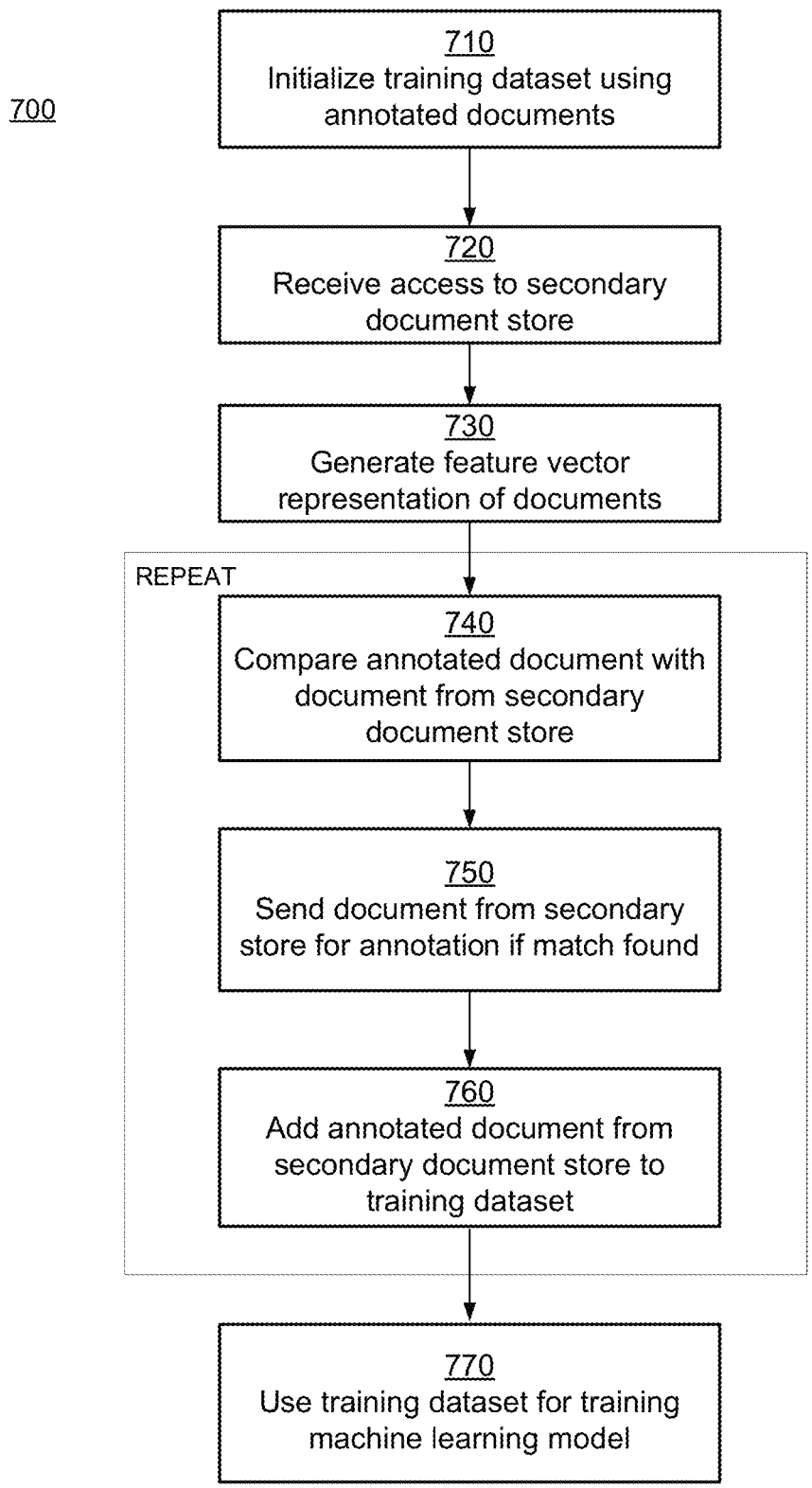
FIG. 7 is a flowchart illustrating a process for generating training data for machine learning models for predicting metadata attributes of documents, in accordance with an example embodiment.
Figure 8:
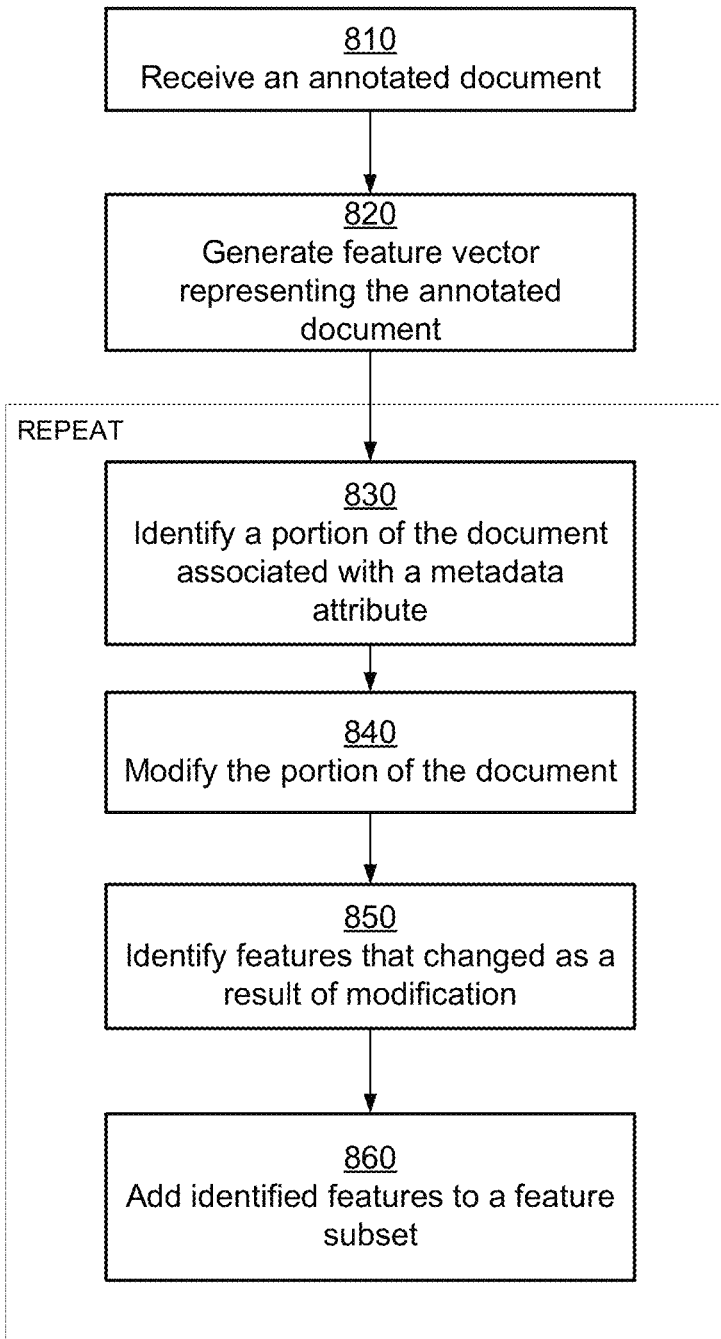
FIG. 8 is a flowchart illustrating a process for identifying subset of features of a feature vector representing a document for identifying matching documents, in accordance with an example embodiment.
Figure 9:
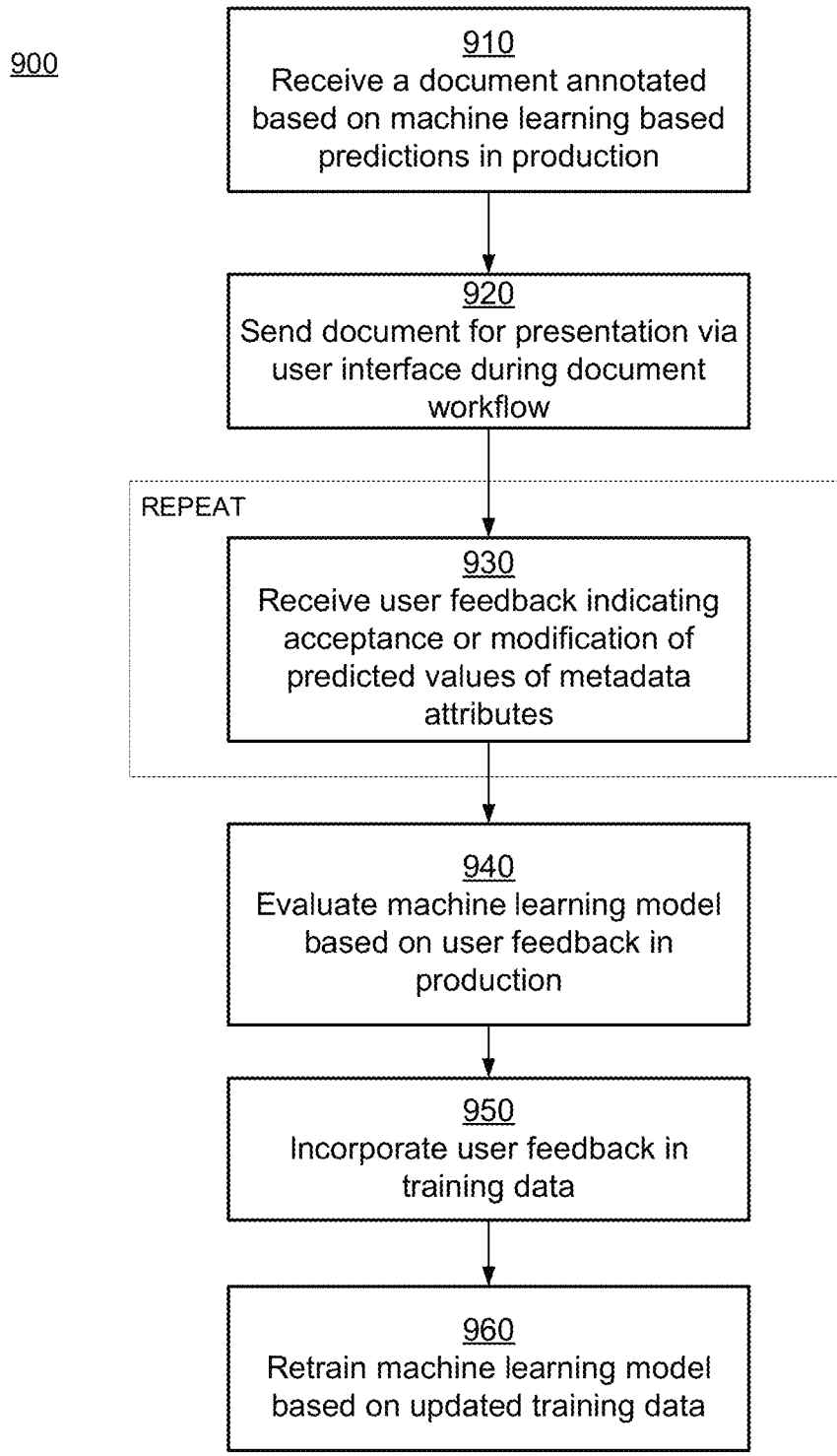
FIG. 9 is a flowchart illustrating a process for evaluating and retraining machine learning models based on user feedback on predictions made by machine learning models deployed in production, in accordance with an example embodiment.

The training data generation module 320 generates training data used by the machine learning module 310 for training the machine learning models. Details of the architecture of the training data generation module 320 are shown in FIG. 6 and processes associated with the training data generation module 320 are shown in FIGS. 7-9.

Figure 10:
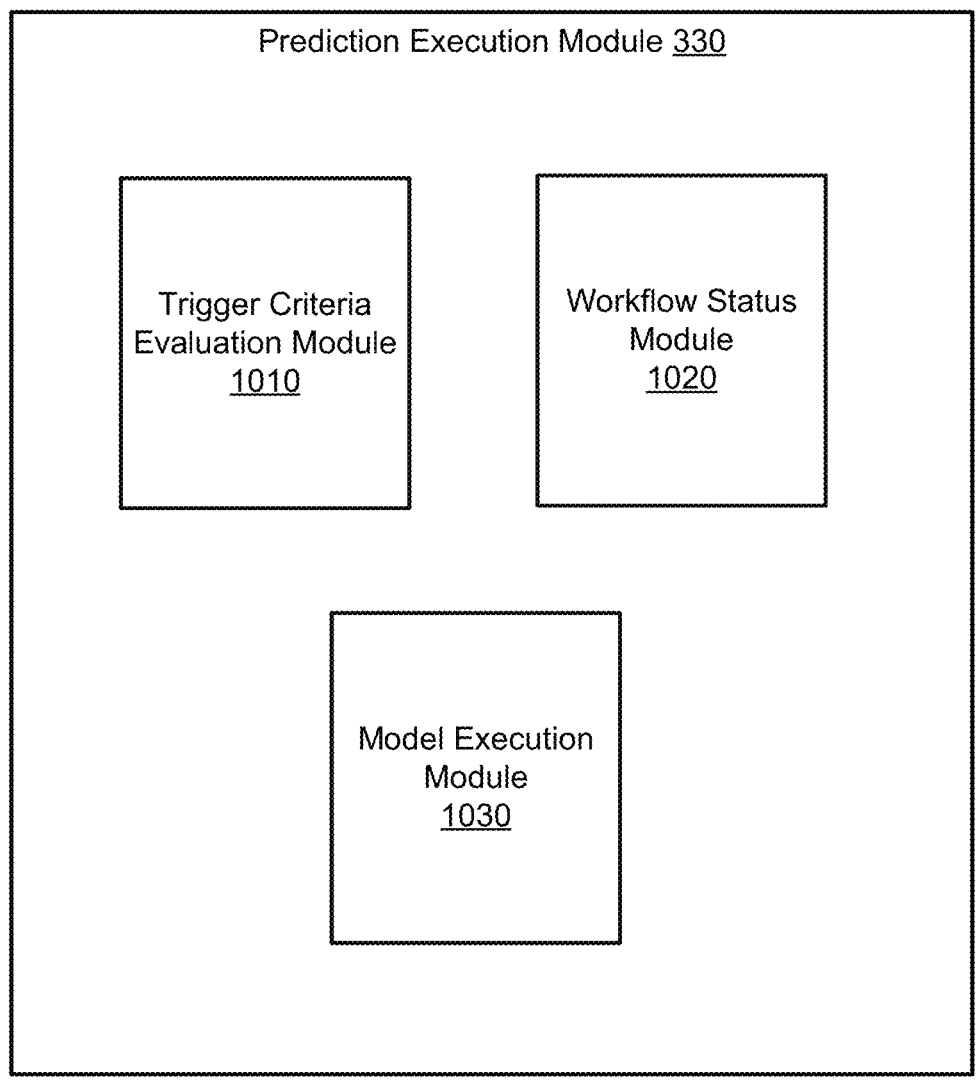
FIG. 10 is a high-level block diagram of a system architecture of a prediction execution module, in accordance with an example embodiment.
Figure 11:
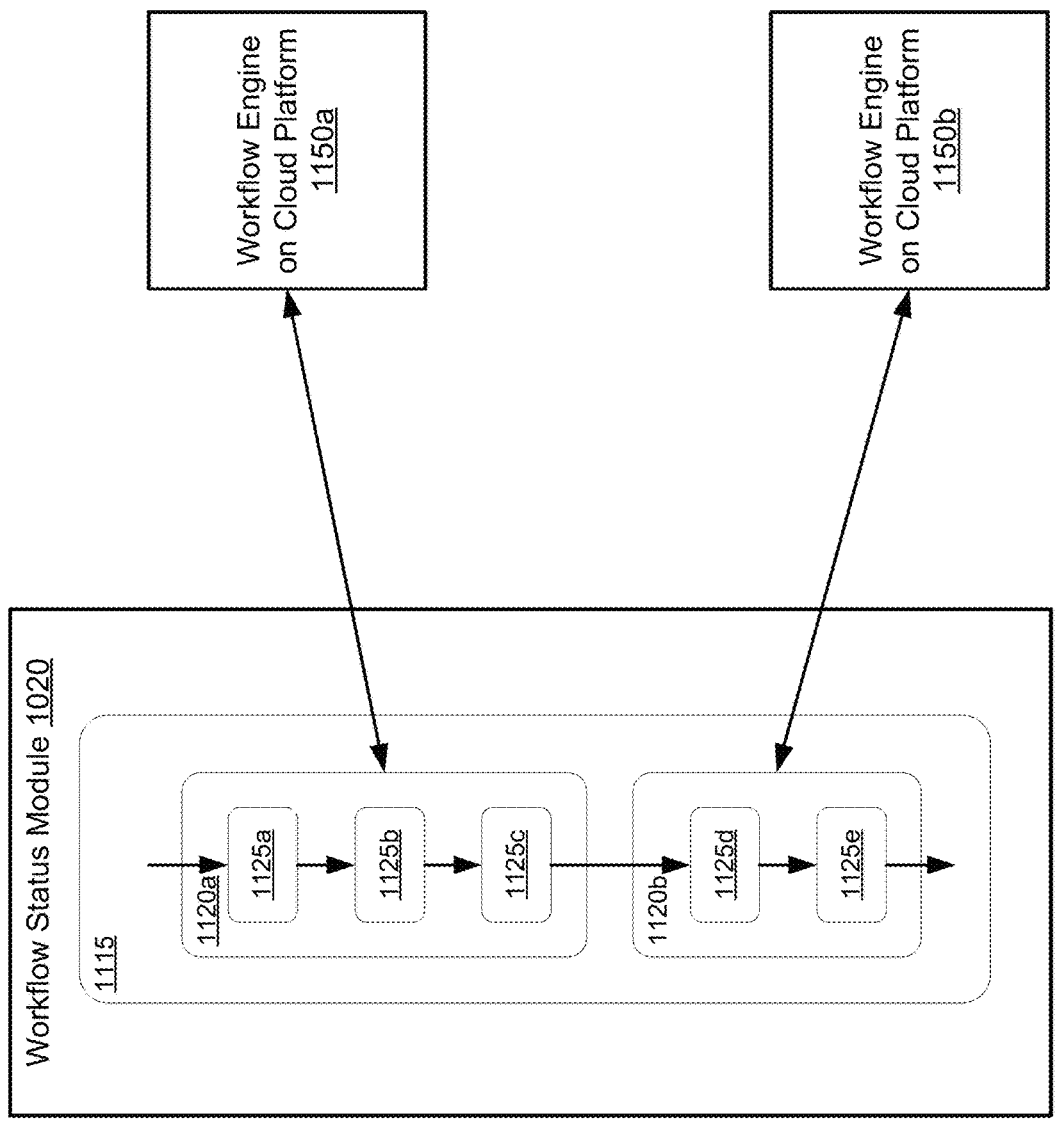
FIG. 11 is a flowchart illustrating a process of collection of status of document workflows being executed by a document management system, in accordance with an example embodiment.

The model execution module 330 determines when the machine learning models are executed for predicting metadata associated with documents, for example, during particular stages of a document workflow. Details of the architecture of the model execution module 330 are shown in FIG. 10 and the process associated with the model execution module 330 is shown in FIG. 11.

Machine Learning Based Metadata Prediction

FIG. 4 is a high-level block diagram of a system architecture of the machine learning module, in accordance with an example embodiment. The machine learning module 310 includes a feature extraction module 410, a training module 420, a training data store 430, and a machine learning model store 440. Other embodiments may include more or fewer modules than those indicated in FIG. 4.

The machine learning model store 440 stores the parameters of the machine learning models. According to an embodiment, the system initializes the parameters of the machine learning models and then modifies them during the training phase. The system may initialize parameters using random values (to train a new model) or initialize using parameters of a pretrained model (to adapt/fine tune an existing model). In some embodiments, the model store 230 may store various versions of models as they are updated over time, for example, as a model is retrained or updated.

According to an embodiment, the machine learning model is a deep learning based neural network such as a transformer. According to an embodiment, the machine learning model is pretrained/adapted using language modeling (with an autoregressive loss function) and/or masked language modeling (with an autoencoder loss function), masking keywords of the document and training the machine learning model to predict the masked portion. This self-supervised training generates a pretrained model, which can then be finetuned to predict document metadata. According to an embodiment, the machine learning model receives as input a token or a sequence of tokens and outputs logits or scores representing a probability that the input represents a particular metadata attribute. For example, if the input token represents a name, the output may represent a score indicating a likelihood that the token represents an entity performing the interaction. The machine learning model may output multiple scores, one for each metadata attribute value. The system selects the metadata attribute corresponding to the most likely output. The search for the most likely output may be performed using a greedy search or a beam search. The processing time of the machine learning model may depend on the size of the sequence of tokens that is input. Accordingly, the system may split the document into smaller sequences, such as sentences to process using the machine learning model. Although embodiments described herein use deep neural networks as machine learning models for predicting metadata, other embodiments may use other types of machine learning models, for example, support vector machines (linear SVM), boosting for other algorithms (e.g., adaptive boosting (AdaBoost) or gradient boosting), shallow neural networks, logistic regression, naïve Bayes, memory-based learning, random forests, bagged trees, decision trees, boosted trees, or boosted stumps.

According to an embodiment, the system compares predictions of adjacent tokens or sequences of tokens. For example, if each token from a set of adjacent tokens is determined to predict the same metadata attribute, the system may assign the metadata attribute to the set of adjacent tokens. For example, the set of adjacent tokens may form a phrase such that the system associates the metadata attribute with the phrase or the set of adjacent tokens. Similarly, if each sequence of tokens from a set of adjacent sequences of tokens is determined to predict the same metadata attribute, the system may assign the metadata attribute to the set of adjacent sequences of tokens. For example, each sequence of tokens may represent a sentence and the set of adjacent sequences of tokens may form a paragraph or a section of the document such that the system associates the metadata attribute with the paragraph or section or the set of adjacent sequences of tokens.

Certain predictions of the machine learning model are associated with individual tokens. These are word-level predictions, for example, contracting parties, contract type, contract value, renewal notice period, renewal term, start date, termination date, termination notice period, and so on. Certain predictions of the machine learning model are associated with sequences of tokens. These are sentence-level or paragraph-level predictions, for example, various clause of the contract such as an assignable clause, autorenewal clause, contract term, indemnity clause, limitation of liability clause, force majeure clause, payment of terms clause, termination clause, and so on.

According to an embodiment the system performs post processing to convert terms of the document to standardized representations, for example, the term "Beta Corporation" may be replaced with a standardized term such as "Beta Corp", the term "confidentiality agreement" may be replaced with a standardized term such as "Non-Disclosure agreement", dates may be replaced using standardized date formats. Since the system is able to associate phrases or sentences with metadata attribute, the system is able to replace the terms using semantically equivalent terms. According to an embodiment, the model receives the entire document as an input. The model may use sparse attention to analyze the entire document efficiently.

According to an embodiment, the system uses multiple machine learning models. For example, a machine learning model M1 may be used to processing individual tokens and a machine learning model M2 may be used for processing sequences of tokens. In other embodiments the same machine learning model may process both tokens as well as sequences of tokens. Training a single model has an advantage that the training based on one type of input provides cross training for other type of input. For example, knowing a sentence comprises one type of metadata has implications for whether the tokens of the sentence may comprise another type of metadata. Having a single model evaluate both tokens and sequences of tokens could also improve processing efficiency.

The machine learning model is trained to predict various metadata attributes of the document. The document may represent an interaction between entities, for example a contract between two or more parties and the machine learning model predicts the attributes describing the interaction. Examples of attributes describing the interaction include a type of interaction (e.g., the contract type indicating whether the contract represents a lease, a merger agreement, and so on). The machine learning model may predict attributes describing the entities, for example, the machine learning model may predict the entities themselves or the role of each entity in the interaction. The machine learning model may predict dates associated with the interaction, for example, effective date of the interaction, an expiration data associated with a contract, a time or date for signing a contract, a time for triggering renewal of the contract, and so on. The machine learning model may predict a location associated with the interaction, for example, a location of the contract that may determine laws that are applicable to the interaction. The machine learning model may predict various values associated with the interaction, for example, a contract value. The machine learning model may determine significance of various portions of the document, for example, the machine learning model may predict may identify various types of clauses in the document, various obligations within the document, and so on. The machine learning model may predict various contract specific metadata attributes such as a renewal notice period, termination notice period, and so on. The machine learning model may predict various attributes of the document, for example, a category describing the document for storing in the document management system. A category may indicate whether the document is a contract, a particular type of agreement, a lease, and so on. The category may be based on the type of interaction between entities as represented by the document or may be based on other or additional information. The machine learning model may predict other system attributes related to the document, for example, a folder in which the document is stored or displayed as being stored in a user interface such as a dashboard.

The training data store 430 stores the training data. Users may label the documents by annotating various portions of the documents. The annotated documents act as training data. The system automatically identifies other documents that are similar to the annotated documents so that additional training data may be obtained. The training dataset may include a positive training set and a negative training set. The positive training set includes the portions of text in documents that represent a particular metadata attribute. The negative training set includes portions of text in documents that do not represent that particular metadata attribute.

The training module 420 trains the machine learning models using training data. According to various embodiments the system uses techniques such as gradient descent to modify the parameters of the machine learning models so as to minimize a loss function representing a difference between the predicted values and the labelled values of the training data. According to an embodiment, the machine learning model is optimized to improve F1-score or F-beta score, a measure of accuracy of the machine learning model which is a function of true positives (TP), false positives (FP) and false negatives (FN). The value of F-beta score may be calculated as TP/(TP+(beta*FN+FP)/(beta+1)) where beta determines how much weight to assign to false negatives. Beta may vary across metadata attributes, as some metadata attributes may be easily found on the first page of a document while other metadata attributes may occur in the middle or near the end of a long document.

The feature extraction module 410 extracts the features or information that is provided as input to the machine learning models. A document comprises a set of tokens representing keywords stored in the document and their relation to other tokens. According to an embodiment, the input to the model comprises a token from the document or a sequence of tokens along with context information for the token or sequence of tokens. The sequence of tokens comprises a set of tokens that are adjacent to one or more other tokens within the sequence. A sequence of tokens may represent a sentence from the document, or a set of adjacent sentences, for example, a paragraph or a section of the document. According to some embodiments, the machine learning model provides additional input describing the document, for example, a storage location of the document such as the folder in which the document was uploaded within the document management system, a name of the document as it was uploaded in the document management system, comments provided with the document, for example, comments representing a description of the document, date of upload, and so on. According to an embodiment, the machine learning model is provided as input information describing other related documents, for example, information describing documents stored in the folder in which the document was uploaded. Accordingly, if the confidence in a particular prediction of a metadata attribute (e.g., the type of interaction, such as the contract type) as indicated by the output score value is below a threshold, the system may determine the metadata attribute based on metadata attributes of related documents. For example, if the confidence in a particular predicted attribute is below threshold, the system analyzes the value of that metadata attribute value for other documents within that folder and if most of the values are consistent, the system uses the information for predicting the value. According to an embodiment, the storage location information is used in conjunction with the document content.

The interaction between the plurality of entities is associated with a set of metadata attributes, for example, the type of interaction, the role of each entity in the interaction, one or more dates associated with the interaction, and so on.

FIG. 5 is a flowchart illustrating a process 500 for predicting metadata attributes for a document using machine learning models, in accordance with an example embodiment. The steps are indicated as being executed by a system, for example, a document management system and may be executed by various modules as shown in FIG. 3 or other modules described herein.

The system receives 510 a document representing an interaction between a plurality of entities for analysis. The document may be provided for analysis during a particular stage of a document workflow, for example, by the model execution module 330.

The system extracts 520 tokens from the document. According to an embodiment, if the document is in a format that does not include text, the system may perform OCR (optical character recognition) on the document to recognize text within the document. The system identifies sequences of tokens that are adjacent to each other in the document. For example, a sequence of tokens may represent a sentence of the document. A sequence of tokens may represent multiple sentences that are adjacent to each other within the document. A sequence of tokens may represent a paragraph or a section of the document.

The system repeats the steps 530, 540, and 550, for example, for each token or sequence of tokens. The system provides 530 the extracted token or sequence of tokens as input to a machine learning model. The machine learning models is trained to predict scores indicating a likelihood that a token or a sequence of tokens of an input document represents a metadata attribute describing the interaction between the plurality of entities. According to an embodiment, the input to the machine learning model is the entire document being analyzed. The machine learning model uses attention to determine which portion of the document is relevant for each prediction.

The system executes 540 the machine learning model to predict metadata attributes describing the interaction between the plurality of entities based on the input token or sequence of tokens of the document.

The system annotates 550 the input token or the sequence of tokens of the document with a metadata attribute predicted using the machine learning model. Accordingly, the system may store the metadata attribute values in association with tokens or sequences of tokens of the document.

The system provides 560 the annotated document for display, for example, via the user interface 200. The user interface 200 allows the user to review the predictions and also provide feedback by indicating whether a prediction is correct or not and providing the correct value if the prediction is not correct. The user interface 200 also shows the portions of documents used to predict a metadata attribute.

Generating Training Data for Machine Learning Models

Obtaining training data for training machine learning models for predicting metadata is challenging since generating metadata requires manual processing of the documents by experts as well as availability of appropriate documents. For example, to train the machine learning model to predict metadata for contracts, the system needs several contract documents that are annotated. The system utilizes techniques for identifying relevant documents for training machine learning models.

FIG. 6 is a high-level block diagram of a system architecture of a training data generation module, in accordance with an example embodiment. The training data generation module 220 includes a feature evaluation module 610, a document evaluation module 620, an annotated document store 630, and a secondary document store 640. Other embodiments may include more or fewer modules than those indicated in FIG. 6.

The annotated document store 630 stores documents that are annotated with metadata attributes. The documents may be annotated by users, for example, domain experts. The system uses the documents stored in the annotated document store 630 as the training data for training machine learning models for predicting metadata attributes. However, annotating documents is a tedious and slow process and the number of documents that are available for annotation are typically small.

The system has access to a secondary document store 640 that is typically a large repository of documents. The secondary document store 640 may be an external document store such that the training data generation module 220 has access to secondary document store 640. For example, the secondary document store 640 may be a public store of documents that may be made available by an organization. However, the documents of the secondary document store 640 are not annotated. Since the number of documents in the secondary document store 640 may be significantly large, for example, compared to the number of documents stored in the annotated document store, it can be a slow process for users to review the documents of the secondary document store 640. The training data generation module 220 matches documents of the annotated document store 630 against documents of the secondary document store to filter documents of the secondary document store 640 to obtain a smaller set of documents that represent documents similar to the annotated documents of the annotated document store. The filtered document may be annotated for use as training data for training machine learning models for predicting metadata attributes of documents.

The feature evaluation module 610 identifies a subset of features of the documents that need to be compared to match documents of the annotated document store 630 and the secondary document store 640.

The document evaluation module 620 executes the processed described herein to evaluate documents of the secondary document store 640 to identify a subset of documents that match documents of the annotated document store 630.

The steps of processes shown in FIGS. 7-10 are indicated as being executed by a system, for example, a document management system and may be executed by various modules as shown in FIG. 3 or other modules described herein.

FIG. 7 is a flowchart illustrating a process 700 for generating training data for machine learning models for predicting metadata attributes of documents, in accordance with an example embodiment.

The system receives a set S1 of documents that were previously annotated, for example, documents stored in annotated document store 630. Each document comprises annotations that map tokens or sequences of tokens of the document to metadata attributes describing the interaction.

The system initializes 710 a training dataset using the set S1 of documents. The system identifies other documents that can be added to the training dataset based on their similarity to the documents of the set S1.

The system receives 720 a second set S2 of documents that is larger than the first set of documents. The second set of documents may be the documents stored in the secondary document store 640 that may not be annotated. The set S2 may be a document store in an external system, for example, a public archive service that provides access to documents via APIs.

The system generates 730 feature vector representations of documents from the first set and the second set. The feature vector representation may be generated using a neural network such as an autoencoder. For example, the autoencoder may be trained to receive the document or portions of the document as input, convert them to a feature vector representation and regenerate the input document from the feature vector. The system uses the feature vector that is generated by a hidden layer of the neural network as the feature vector representation of the input document. Other embodiments may generate the feature vector using other techniques, for example, by extracting individual features and storing them in an ordered manner as a feature vector.

The system repeats the steps 740 and 750, for example, for each document of the set S1 and at least a subset of documents from set S2.

The system compares 740 a document D1 from the set S1 with a document D2 from the set S2 by comparing corresponding feature vectors. If a match is found between the document D1 and document D2 indicating that document D2 is similar to the annotated documents of the set S1, the system determines the document D2 as a candidate document for including in the training dataset. The system sends 750 the document D2 for being annotated with metadata attribute so that the document D2 acts as a labelled training data.

The system adds 760 the annotated document D2 to the training dataset. Accordingly, the system selects a subset of documents from the set S2 that match at least a document from the set S1 based on the comparison of corresponding feature vectors of the documents. The system trains 770 the machine learning model to predict metadata attributes of documents using the enhanced training dataset.

According to an embodiment, the system uses only a subset of features for comparing documents of the set S1 and S2. FIG. 8 is a flowchart illustrating a process 800 for identifying feature subset relevant for identifying matching documents, in accordance with an example embodiment.

The system receives 810 a document that has been annotated by users, for example, experts. Accordingly, various tokens or sequences of tokens are associated with metadata attributes in the document.

The system generates 820 a feature vector representing the annotated document. As discussed herein, the system may provide the document as input to a neural network, for example, an autoencoder and extracts an embedding representing an output of a hidden layer of the neural network as the feature vector. Other embodiments may generate the feature vector using other techniques, for example, by extracting individual features and storing them in an ordered manner as a feature vector.

The system repeats the steps 830, 840, 850, and 860 multiple times, for example, for various documents and for various metadata attributes specified via annotations for each document. The system identifies 830 a portion of the document associated with a metadata attribute specified using annotations. The system modifies that portion of the document. For example, the system may delete the document or replace the document with dummy tokens that are meaningless. The system regenerates the feature vector using the modified document. The system identifies 850 features of the feature vector that changed as a result of modifying the document by changing the specific portion associated with the metadata attribute. These features are determined to be associated with the metadata attribute.

The system repeats the above steps 830, 840, 850, and 860 to identify a subset of features of the feature vector. The identified subset of features represents features that characterize the type of documents that are annotated. For example, the annotated documents may be contracts of certain kind. According to an embodiment, the system analyses the same feature using multiple annotated documents to determine statistical information describing the value of the feature for documents of a particular type. The system uses the statistical information to determine whether a particular document matches the annotated documents. For example, based on the distribution of each feature value, the system determines a threshold value for the feature. The system determines a feature of a document D1 matches the corresponding feature of document D2 if the two feature values are within the threshold value. The system may determine a threshold value for each feature.

The system compares documents from another source, for example, documents stored in the secondary document store based on comparison of the subset of features extracted from the set of annotated documents. The system may assign a feature match score for each feature. If the aggregate feature match score for the subset of features for a document is above a threshold value, the system determines that the document matches the annotated document. The system may send that document to users for annotating so that the document can be used as part of training dataset.

The use of a subset of features of the documents makes the process of comparing documents efficient and also increase the accuracy of comparison since noise due to comparison of other features is eliminated. Reviewing documents that are not of the correct type of documents results in waste of resources in terms of storing, communicating, and processing the documents, as well as resources of users manually reviewing the documents. Accordingly accurate filtering of documents improves efficiency of execution of the training data generation process.

According to an embodiment, the system determines a finger print of each document, for example, using a subset of features of the document. The system matches the fingerprint of the document with other documents to find similar documents in a large set of document, for example, a public corpus such as exhibit 10 from 10-K, 10-Q, and 8-K filings of publicly-traded corporations, made available by the Securities and Exchange Commission Electronic Data Gathering, Analysis, and Retrieval system (SEC EDGAR). These documents are then annotated to improve the metadata prediction, as well to analyze errors being made by the metadata prediction system.

A machine learning model that is trained using the training data may show high accuracy based on the training data. However, data encountered by the machine learning model during production may have differences compared to the training data. As a result, the accuracy of the machine learning model in production may be lower than the accuracy determined in development phase i.e., during training. The system according to various embodiments receives user feedback in a production environment to evaluate the machine learning models as well as to gather additional training data. The system may retrain the machine learning model based on information collection during production.

FIG. 9 is a flowchart illustrating a process 900 for evaluating and retraining machine learning models based on user feedback on predictions made by machine learning models deployed in production, in accordance with an example embodiment.

The system receives 910 a document annotated based on machine learning based predictions of metadata attributes. The machine learning based predictions may be made in a production environment where the machine learning models are deployed.

The system sends 920 the annotated document for presentation via a user interface configured to receive user feedback about the metadata attribute predictions. An example user interface for receiving user feedback is shown in FIG. 2.

The system may repeat the step 930 multiple times, for example, depending on the number of times the user provides the feedback. Accordingly, the system receives 930 user feedback regarding the metadata predictions. The user feedback may indicate that the user accepts the metadata prediction of the machine learning model, thereby confirming that the metadata prediction of the machine learning model was accurate. Alternatively, the user may modify the metadata attribute value, thereby indicating that the metadata prediction was inaccurate and further providing the correct metadata attribute value.

The system uses the user feedback to evaluate 940 the machine learning models. Since the type of data available for training the machine learning models may be limited, the type of data encountered in production may be different from the type of data used during training. As a result, the accuracy of the machine learning models in production may be lower that the accuracy measured in development environment, for example, using training data. The use of user feedback in production allows the system to evaluate the machine learning model in a production environment.

Furthermore, the system determines accuracy for different metadata attributes. For example, the accuracy for prediction of the date of an interaction associated with a document may be higher than the accuracy of prediction of the role of entities performing the interaction. The user feedback is used to identify the metadata attributes that have low accuracy.

The system uses this information to make recommendations regarding the type of training data that is needed to further improve the machine learning models. Accordingly, the system incorporates 950 the user feedback in obtaining additional training data. For example, the system provides information regarding all metadata attributes for which an evaluation score is determined to be below a threshold value. The system may request additional training data that includes annotations for these specific attributes.

According to an embodiment, the system uses the process described in FIG. 8 to identify documents in the secondary document store that are strong candidates for use as training data for specific metadata attributes. For example, the system selects features that are determined to change as a result of modifying portions of documents that are associated with the specific metadata attributes that are determined to have low evaluation scores. The system sends the identified documents to experts for annotation so that the annotated documents can be used for retraining the machine learning models. The system receives updated training data for the recommended metadata attributes. The system retrains 960 the machine learning models based on the updated training data received based on the user feedback.

Triggering Execution of Machine Learning Models Based on Document Workflow

A document may get modified during a document workflow. For example, a document gets modified when the document is uploaded or edited by users. The system determines when the machine learning based metadata prediction is triggered during a document workflow. Requiring users to manually trigger the metadata prediction may slow down the document workflow and is prone to user errors, for example, if the user triggers the metadata prediction too early or too late. This may result in the metadata prediction results not being available when they are needed by the system during document workflow. For example, if the metadata predictions are available too late, the system may make document workflow decisions using incorrect document metadata. Alternatively, if the metadata prediction is triggered too early, the system may modify the document again soon after the metadata prediction, thereby making the predictions invalid. The document management system may process a large number of documents for example, several thousand documents, each document associated with one or mor document workflows. The system uses one or more processes to determine when to trigger metadata prediction for a particular document. According to an embodiment, the system uses a service, for example, a microservice to monitor document workflows and trigger metadata prediction of documents.

FIG. 10 is a high-level block diagram of a system architecture of a prediction execution module, in accordance with an example embodiment. The prediction execution module 330 includes a trigger criteria evaluation module 1010, a workflow status module 1020, and a model execution module 1030. Other embodiments may include more or fewer modules than those indicated in FIG. 6.

The workflow status module 1020 receives status of execution of various document workflows being executed by the document management system. The details of collection of the status of execution of document workflows are illustrated in FIG. 11 and described in connection with FIG. 11.

The trigger criteria evaluation module 1010, evaluates trigger criteria for a given workflow. According to an embodiment, the document management system allows users to specify the trigger criteria. Accordingly, the document management system receives and stores the trigger criteria for a document. The document management system may use a default trigger criterion if the user does not specify a specific trigger criterion for the document. The trigger criteria may specify that metadata prediction should be triggered upon successful completion of steps of the document workflow that include specific operations such as modifying the document, saving the document, uploading a new document. The trigger criterion may specify that metadata prediction should be triggered after the document is modified more than a threshold number of times. A trigger criterion may specify that metadata prediction should be triggered if more than a threshold time has passed since the last time the document was updated, indicating a high likelihood that the user completed modifying the document.

The model execution module 1030 orchestrates the execution of the metadata prediction by executing the machine learning model or machine learning models for portions of documents, for example, as illustrated in FIG. 5. The model execution module 1030 may be invoked by the trigger criteria evaluation module 1010, for example, if the trigger criterion for a document based on the status of execution of a step of a document workflow based on the document indicates that metadata prediction should be triggered.

FIG. 11 illustrates the process or collection of document workflow status, in accordance with an example embodiment. The workflow status module 1020 receives one or more document workflow specifications. The system generates graph representation 1115 of the document workflow specification. Each node of a document workflow represents a step of the document workflow and can be a workflow itself comprising a set of nodes. For example, node 1120a comprises nodes 1125a, 1125b, 1125c and node 1120b comprises nodes 1125d, 1125e. Accordingly, each node 1120a, 1120b of a document workflow graph is recursively defined as a document workflow graph.

The steps of the document workflow may be executed using workflow engines 1150a, 1150b that execute on cloud platforms. According to an embodiment, the step represented by the node 1120a of the graph execute on one workflow engine 1150a executing on a cloud platform whereas the step represented by the node 1120b executes on a different workflow engine 1150b executing on the same or a different cloud platform.

The workflow status module 1020 tracks the execution of the document workflow represented by the graph representation 1115 across all the workflow engines 1150a, 1150b used to execute the document workflow. For example, the workflow status module 1020 may send a request for execution of one or more steps of the document workflow corresponding to graph representation 1115 to each workflow engine assigned for executing the corresponding steps and receives the status of execution of the steps corresponding to nodes of the graph representation 1115 from each workflow engine 1150a, 1150b.

Figure 12:
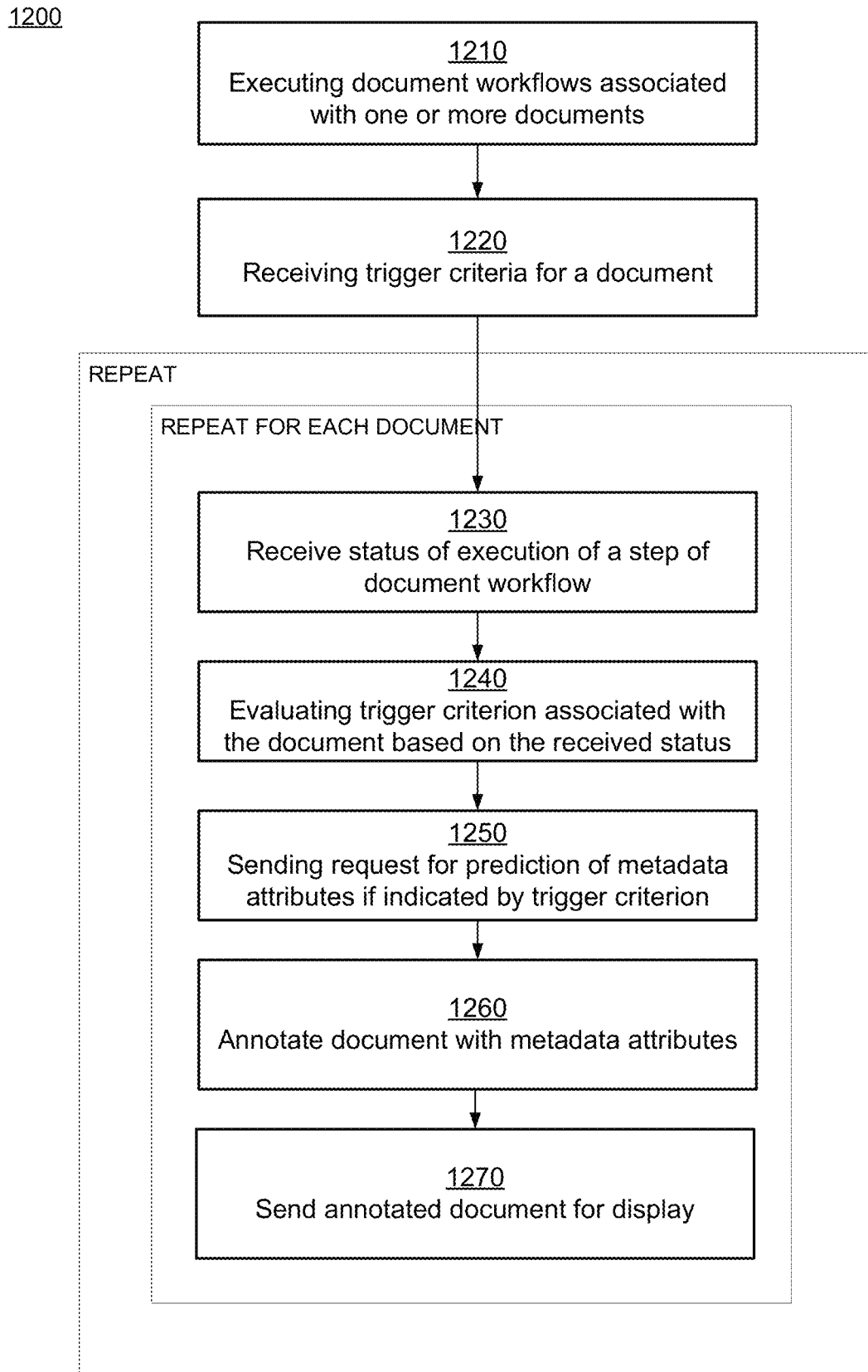
FIG. 12 is a flowchart illustrating a process for scheduling execution of the machine learning models during document workflow execution, in accordance with an example embodiment.

FIG. 12 is a flowchart illustrating a process 1200 for scheduling execution of the machine learning models during document workflow execution, in accordance with an example embodiment. The steps are indicated as being executed by a system, for example, a document management system and may be executed by various modules as shown in FIG. 3 or other modules described herein.

The system executes 1210 document workflows associated with one or more documents. Each document workflow may be specified using a document workflow specification. The document workflow specification specifies a sequence of steps that are executed as part of the document workflow.

The system receives 1220 trigger criteria for each one or more documents. A trigger criterion specifies conditions for triggering execution of machine learning based prediction of metadata attributes for a document.

The system repeatedly executes the following steps 1230, 1240, 1250, 1260, and 1260, for each document. The system receives 1230 status of execution of a particular step of document workflow for the document. The system evaluates 1240 a trigger criterion associated with the document based on the received status of execution of the particular step. If the evaluation of the trigger criterion indicates that metadata prediction should be triggered, the system sends 1250 a request for prediction of metadata attributes based on the document. The prediction of metadata attributes based on the document is performed by executing one or more machine learning based models. Each machine learning model is trained to predict a likelihood that a portion of an input document represents a metadata attribute describing an interaction between a plurality of entities.

The system annotates 1260 the document with one or more metadata attributes predicted using the one or more machine learning models. The system sends 1270 the annotated document for display via a user interface.

The system modifies the document workflow by introducing steps that require user intervention to provide user feedback regarding the metadata predictions. If the model accuracy is determined to be high (e.g., above a threshold value), the system may reduce the number of times documents are presented to users for user feedback. The system may trigger metadata prediction and continue with the document workflow without requiring users to confirm the results of prediction. The system may sample documents for presenting metadata prediction results to users. The system may determine the sampling rate based on the accuracy of the machine learning model. Accordingly, the sampling rate is inversely related to the accuracy of the machine learning model. For example, if the model accuracy is determined to be above a threshold value, the system reduces the number of samples of documents that are presented via the user interface 200 for user feedback. Alternatively, if the model accuracy is determined to be below a threshold value, the system reduces the number of samples of documents that are presented via the user interface 200 for user feedback.

According to an embodiment, the system measures the accuracy of each type of metadata attribute that is predicted. The system may request user feedback only for a subset of metadata attributes that have less than a threshold accuracy. If the system determines that the accuracy of prediction of a metadata attribute exceeds a threshold value, the system may annotate the document using the metadata attribute but not request the user to provide feedback regarding the metadata attribute.

According to an embodiment, the system uses historical data to determine when to trigger metadata prediction. For example, if a user does not specify trigger criteria for a document workflow for a document, the system uses trigger criteria for similar documents processed using document workflows by the document management system in the past. According to an embodiment, the system uses a model, for example, a machine learning based model to predict whether metadata prediction should be triggered for a particular stage of a document workflow. The model receives as input information describing the document workflow and a particular step of the workflow and predicts whether the metadata prediction should be triggered for the given step of the document workflow.

A process, for example, a service such as a microservice receives information describing current steps of execution of various document workflows and determines whether metadata prediction should be triggered during or after execution of the current step of a particular document workflow.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method for machine learning based prediction of document metadata, the computer-implemented method comprising:
    execute, by a document management system, document workflows for one or more documents, wherein each of the one or more documents represents an interaction between a plurality of entities, each document workflow comprising a plurality of steps;
    receive one or more trigger criteria, each trigger criterion specifying conditions for triggering execution of machine learning based prediction of metadata attributes for a document;
    execute, for each document of the one or more documents:
        receiving status of execution of a particular step of document workflow for the document;
        evaluating a trigger criterion associated with the document based on the received status of execution of the particular step;
        responsive to the evaluation of the trigger criterion indicating that metadata prediction should be triggered, send request for prediction of metadata attributes based on the document by executing one or more machine learning models trained to predict a likelihood that a portion of an input document represents a metadata attribute describing an interaction between a plurality of entities, wherein the portion of the input document comprises a token or sequence of tokens from the document associated with the metadata attribute;
        annotate the document with one or more metadata attributes predicted using the one or more machine learning models; and
        cause for display, the annotated document via a user interface.

2. The computer-implemented method of claim 1, wherein a trigger criterion specifies a type of action associated with the document performed in a particular step of the document workflow.

3. The computer-implemented method of claim 1, wherein the steps of the document workflow include one or more of: a document upload step, a document update step, a document signing step, an identity verification step, or a step for configuring and presenting a form for receiving information.

4. The computer-implemented method of claim 1, wherein a document workflow for a document is performed by execution of a document workflow specification comprising a sequence of steps associated with the document, the document workflow executed on a cloud platform.

5. The computer-implemented method of claim 1, further comprising:
receive user feedback via the user interface, the user feedback comprising one or more of:
(1) a correction of a predicted metadata attribute or
(2) an approval of a predicted metadata attribute.

6. The computer-implemented method of claim 5, further comprising:
use the user feedback for evaluation of the one or more machine learning models.

7. The computer-implemented method of claim 5, further comprising:
use the user feedback for generating training data for retraining the one or more machine learning models.

8. The computer-implemented method of claim 1, wherein a machine learning model predicts a score indicating that the portion of the input document represents a date associated with the interaction between the plurality of entities.

9. The computer-implemented method of claim 1, wherein a machine learning model predicts a role of an entity from the plurality of entities.

10. A non-transitory computer-readable storage medium storing executable instructions that, when executed by one or more computer processors, cause the one or more computer processors to perform operations comprising:
execute, by a document management system, document workflows for one or more documents, wherein each of the one or more documents represents an interaction between a plurality of entities, each document workflow comprising a plurality of steps;
receive one or more trigger criteria, each trigger criterion specifying conditions for triggering execution of machine learning based prediction of metadata attributes for a document;
execute, for each document of the one or more documents:
receive status of execution of a particular step of document workflow for the document;
evaluate a trigger criterion associated with the document based on the received status of execution of the particular step;
responsive to the evaluation of the trigger criterion indicating that metadata prediction should be triggered, send request for prediction of metadata attributes based on the document by executing one or more machine learning models trained to predict a likelihood that a portion of an input document represents a metadata attribute describing an interaction between a plurality of entities, wherein the portion of the input document comprises a token or sequence of tokens from the document associated with the metadata attribute;
annotate the document with one or more metadata attributes predicted using the one or more machine learning models; and
cause for display, the annotated document via a user interface.

11. The non-transitory computer-readable storage medium of claim 10, wherein a trigger criterion specifies a type of action associated with the document performed in a particular step of the document workflow.

12. The non-transitory computer-readable storage medium of claim 10, wherein the steps of the document workflow include one or more of: a document upload step, a document update step, a document signing step, an identity verification step, or a step for configuring and presenting a form for receiving information.

13. The non-transitory computer-readable storage medium of claim 10, wherein a document workflow for a document is performed by execution of a document workflow specification comprising a sequence of steps associated with the document, the document workflow executed on a cloud platform.

14. The non-transitory computer-readable storage medium of claim 10, wherein the instructions further cause the one or more computer processors to perform steps comprising:
receive user feedback via the user interface, the user feedback comprising one or more of:
(1) a correction of a predicted metadata attribute or
(2) an approval of a predicted metadata attribute.

15. The non-transitory computer-readable storage medium of claim 14, wherein the instructions further cause the one or more computer processors to perform steps comprising:
use the user feedback for evaluation of the one or more machine learning models.

16. The non-transitory computer-readable storage medium of claim 14, wherein the instructions further cause the one or more computer processors to perform steps comprising:
use the user feedback for generating training data for retraining the one or more machine learning models.

17. The non-transitory computer-readable storage medium of claim 10, wherein a machine learning model predicts a score indicating that the portion of the input document represents a date associated with the interaction between the plurality of entities.

18. The non-transitory computer-readable storage medium of claim 10, wherein a machine learning model predicts a role of an entity from the plurality of entities.

19. A computer system comprising:
one or more computer processors; and
a non-transitory computer-readable storage medium storing executable instructions that, when executed by the one or more computer processors, cause the one or more computer processors to perform operations comprising:
execute, by a document management system, document workflows for one or more documents, wherein each of the one or more documents represents an interaction between a plurality of entities, each document workflow comprising a plurality of steps;
receive one or more trigger criteria, each trigger criterion specifying conditions for triggering execution of machine learning based prediction of metadata attributes for a document;
execute, for each document of the one or more documents:
receive status of execution of a particular step of document workflow for the document;
evaluate a trigger criterion associated with the document based on the received status of execution of the particular step;
responsive to the evaluation of the trigger criterion indicating that metadata prediction should be triggered, send request for prediction of metadata attributes based on the document by executing one or more machine learning models trained to predict a likelihood that a portion of an input document represents a metadata attribute describing an interaction between a plurality of entities, wherein the portion of the input document comprises a token or sequence of tokens from the document associated with the metadata attribute;

annotate the document with one or more metadata attributes predicted using the one or more machine learning models; and cause for display, the annotated document via a user interface.

20. The computer system of claim 19, wherein the instructions further cause the one or more computer processors to perform steps comprising:

receive user feedback via the user interface, the user feedback comprising one or more of:
(1) a correction of a predicted metadata attribute or
(2) an approval of a predicted metadata attribute.

* * * * *